Figure 1:
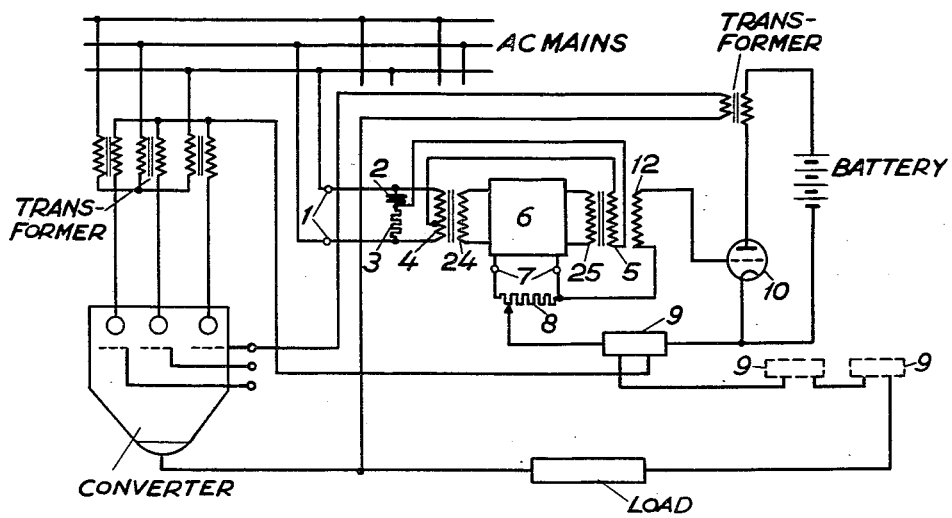

INVENTORS
Uno Lamm and
Erich Uhlmann
BY
Attorney.

Dec. 11, 1956  U. LAMM ET AL  2,774,012
CONTROL MEANS FOR STATIC CURRENT CONVERTERS
Filed May 28, 1953  3 Sheets-Sheet 3

Inventors
Uno Lamm and
Erich Uhlmann
By
Attorney.

United States Patent Office 2,774,012
Patented Dec. 11, 1956

2,774,012

CONTROL MEANS FOR STATIC CURRENT CONVERTERS

Uno Lamm and Erich Uhlmann, Ludvika, Sweden, assignors to Allmanna Svenska Elektriska Aktiebolaget, Vasteras, Sweden, a corporation of Sweden Application May 28, 1953, Serial No. 358,074

Claims priority, application Sweden June 4, 1952

16 Claims. (Cl. 315—148)

In the patent specification 2,479,242, there is described a control means for static current converters, especially inverters, which is especially intended for such cases in which the shape of the alternating current curve presents irregularities which tend to prevent the completion of the commutation in due time. In order to eliminate the unfavorable influence of such irregularities, the means according to the said specification are such that the instant of initiating the commutation is made individually dependent on a voltage in the main circuit defining the commutation, and more particularly on the instantaneous value of this voltage.

The forms of the control means described in the specification 2,479,242 are, however, not of such character as to pay attention to all irregularities of the voltage in the main circuit defining the commutation—hereinafter for the sake of shortness called the commutating voltage—which may appear at a disturbance. Among such possible and rather frequent disturbances, a prominent example is a reduction of the voltage, at least in one or some of the phases of the alternating current line, which moreover often appears in conjunction with an increase of current. Since the condition for a commutation is that a voltage-time integral substantially proportional to the current is available in the main circuit, it is obvious that a simultaneous reduction of voltage and increase of current causes a considerable increase in the time necessary for the commutation, which means that the commutation must begin much earlier than normally in order to be completed in ample time before the zero passage of the voltage.

According to the present invention, the means controlling the commutation are so arranged that the voltage-time integral available for commutation, deionisation etc.—which in the ordinary voltage diagram appears as a surface and therefore frequently is called the voltage surface—will be substantially proportional to the current but independent of the voltage. The upper limit of the said integral is determined by the so-called commutation margin, i. e. the time difference between the completion of the commutation and the zero passage of the voltage, which time difference may be kept substantially constant or may be adjusted according to a certain programme, for instance so as to be current dependent to a certain extent. Several factors may influence the choice of this programme, for instance the supply of reactive power in the alternating current system.

It has now been found that the electrical derivation of the said voltage-time integral as a rule is most easily accomplished in originating from the corresponding peak value of the voltage. This has also been found to bring about the simplification that the current-dependent portion of the function expressing the condition for completing the commutation in due time will be a linear function, easy to derive physically. Then for instance the last peak value of the voltage may be conserved by being impressed on a condenser the discharge of which is prevented for instance by means of a valve or the like as far as is necessary for the proper completion of the commutation. As a rule, however, it is better to start from the quantities which are available at each instant and derive the peak value of the voltage therefrom and then choose this value as an origin.

The quantities which are available at every instant for deriving the peak value are first of all the voltage itself and its time derivative, the latter being possible to derive from the voltage for instance by means of a condenser or by means of an ohmic resistor and a reactor. As a rule, however, the voltage curve is not a pure sine curve but contains certain harmonics, which especially when using a condenser for creating the time derivative may considerably disturb the result, and therefore it generally gives a more exact result to derive by some known method a voltage displaced in phase by 90° from the original one and forming thus the cosine of the same angle of which the original voltage, apart from the harmonics, is a sine function, since the derivative of a sine is a cosine, as is well-known. On the contrary, it is not possible to derive the latter function, which hereinafter is generally called the complementary function, from other phases of the current source, as the present invention is particularly intended for the case that a dissymmetry exists between the phases.

Deviations from the sine shape of the voltage curve may depend not only on disturbances in the alternating current system, for instance arcs caused by partial ground connections or in special load objects, but also on irregularities in the converter itself, for instance commutation harmonics in other parts thereof than the valve path especially aimed at in this specification. At least in polypulse converters it will probably be necessary to compensate by suitable means, for instance by those described in the patent specification No. 2,621,319, some of these commutation harmonics—those which follow next in time after the commutations here in question—and harmonics coming from the alternating current system may be reduced by suitable filters, in which case it will be important that the shape and phase of the fundamental wave are not appreciably influenced hereby. After this has been done, it is as a rule possible to derive the complementary function with an accuracy sufficient for practical purposes for instance by a combination of positive or negative reactances (capacitances) and ohmic resistances, respect being paid to a sufficient damping of high harmonics for not appreciably influencing the result. After the complementary function has been derived, the peak value can be determined with an accuracy sufficient for most purposes from the original and the complementary function for instance by creating the square root of the sum of the squares of said functions by any of the methods forming the object of the patent specification No. 2,707,765, or by means of high frequency transductors.

After the peak value of the voltage has been derived by any of the aforesaid methods, the problem arises to derive therefrom a function which traverses a predetermined value, for instance the value zero, at the instant when the commutation should be initiated for being completed in due time. If the value of the voltage at each instant is designated by $e$, the value of the above defined complementary function by $e_1$, the peak value of the voltage by $E$, the electrical angle between the instant of initiating the commutation and the zero passage of the voltage by $x$, the corresponding angle between the termination of the commutation and the zero passage of the voltage (the so-called commutation margin) by $\gamma$, the circular frequency of the alternating current by $\omega$, the total inductance between the circuits, between which the commutation takes place, by $L_K$, and the direct current by I, it is found that a function F (x) which traverses zero at the aforesaid instant obtains the form $$F(x) = -E \cos x - [E \cos \gamma - \omega L_K I]$$

The condition should thus be physically realized that the commutation is initiated (generally by means of one or several instantaneously acting auxiliary circuits) when the aforesaid function passes through zero value.

In the expression for $F(x)$, $E \cos x$ is a function of $x$, I and E are quantities not known beforehand, but practically independent of $x$, and $\gamma$ a quantity which may be quite constant, but which is preferably dependent on I according to a predetermined programme, while $\omega$ and $L_K$ generally can be regarded as constant.

Some examples of connections serving the aforesaid purpose of creating the function $F(x)$ are shown in Figs. 1 to 9 of the accompanying drawing.

Referring to Fig. 1, which relates to grid control of a converter 1 designates a pair of terminals, between which the commutation voltage—generally the voltage between two phases of the alternating current mains—is introduced. The connection relates to one phase and will be similar to the other two phases. Between the said terminals, there are connected in parallel a condenser 2 in series with an ohmic resistor 3 and a transformer winding 4. Between the point of connection of the condenser with the resistor and a point on the transformer winding a voltage is tapped, which for a proper dimensioning of the members 2, 3, 4 will be displaced in phase by 90° relatively to the voltage between the terminals 1. The condenser 2 may be replaced by a reactor, which is particularly suitable if it is intended to operate temporarily at a lower frequency, or in connection with the device according to Fig. 9, later to be described. Filtering members for harmonics of the voltage which may be necessary are omitted here.

The transformer winding 4 and the winding 5 of another transformer which winding is fed by the aforesaid voltage displaced in phase by 90° relatively to the voltage between the terminals 1, co-operate each with one secondary winding 24, 25 respectively, which two windings are connected to an apparatus 6 which creates the square root of the sum of the squares of the two entering voltages (in the following, for the sake of shortness, called their square sum), and which may be designed according to one of the ways described in the patent application No. 345,162 or in another way, and which is therefore only diagrammatically shown. The aforesaid square sum may be tapped between the terminals 7 as a voltage and for instance impressed on a potentiometric resistor 8. An adjustable tap on the said resistor is connected to the cathode of an electronic valve 10 through an apparatus 9, which is only diagrammatically illustrated here and which is shown triplicated in the converter current circuit to serve all the phases, one form of the apparatus 9 is shown in detail in Fig. 4, and it serves to introduce a voltage substantially proportional to the load current of the converter. One end of the resistor 8 is in its turn connected to a control grid of the valve 10 through a transformer winding 12, which co-operates with the winding 5 (and possibly may form a detail of the square summing device, although it is illustrated as separate therefrom). By the described devices 6 and 9 and the transformer winding 12, three series-connected voltages are created, which correspond to the three terms in the expression for $F(x)$, namely, the alternating voltage term $e_1$ in the transformer winding 12, the alternating current term $E \cos \gamma$ in the apparatus 6, and the direct current term $L_K I$ in the apparatus 9. The sum of these terms, i. e. the voltage on the grid of the tube 10, shall traverse zero value at the instant of initiating the commutation, and the tube 10 is, in a manner known per se, so connected by means of a transformer to one of the grids of the converter to be controlled that the converter is ignited when the valve 10 is ignited at the said zero passage.

Figure 2:
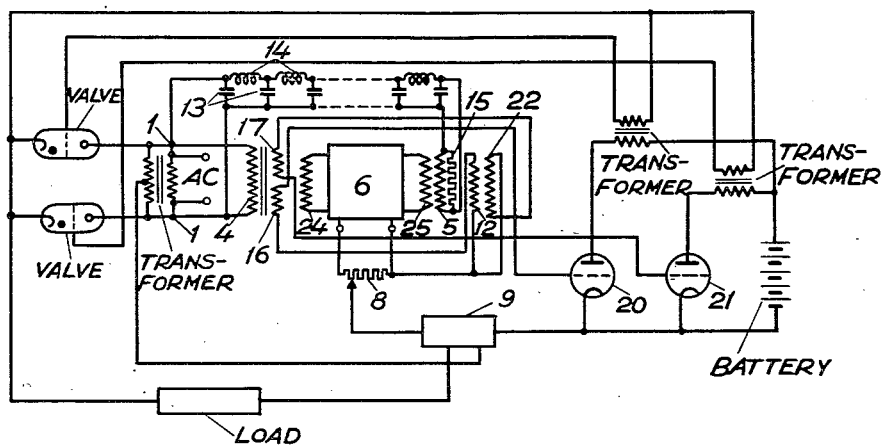

The arrangement of Fig. 2 is intended to control two opposite valves of a two-way connection, and Fig. 2 shows with respect to Fig. 1 several differences which are, however, independent of one another, so that each of them may be applied alone as a modification of Fig. 1. First, the phase displacing device composed of the condenser 2, the resistor 3 and a portion of the winding 4 and serving to create the complementary function is replaced by an artificial line, composed of condensers 13 and inductances 14 and loaded by a resistor 15 so dimensioned that the load created by the same and by the reactor 8 corresponds to the wave resistance of the line, and the whole is so dimensioned that the voltage across the resistor 15 becomes displaced in phase by 90° relatively to the voltage between the entering terminals 1. The voltage thus displaced by 90° is impressed on the transformer winding 5 connected in parallel to the resistor 15, while the voltage between the terminals 1 is impressed on the winding 4, as before. Secondly, there are here two electronic valves 20, 21, intended for the control of the two opposite valves. While the direct current terms in the expression for $F(x)$ may be common to the entire valve equipment, the alternating current term, which is derived from two voltages displaced in phase by 180°, must be derived in a manner compensating this opposition, and for this reason the two transformer windings 12 and 22 which deliver the alternating current components of $F(x)$ are connected in opposition to each other for the two electronic valves. Finally, for reasons to be further explained below, the alternating current components are composed in a manner giving another phase than that of Fig. 1, each such component being composed of two constituent components, one of which is taken from a secondary winding 16 or 17 of the primary winding 4 and the other from one of the aforesaid secondary windings 12 or 22 of the primary winding 5. The current-responsive member is still designated by 9.

Figure 3:
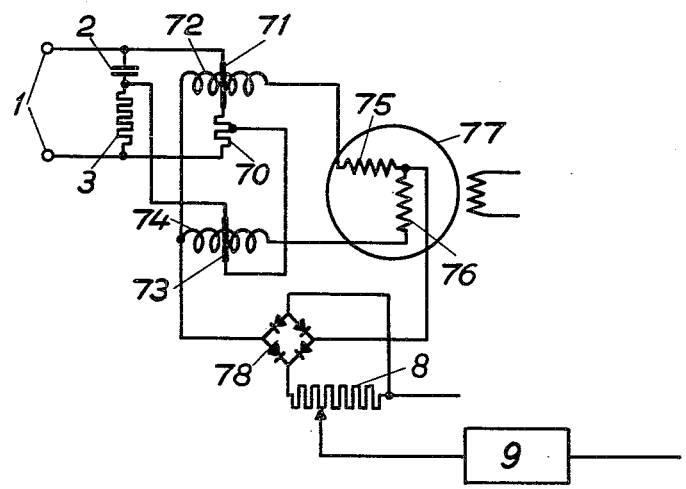
Figure 8:
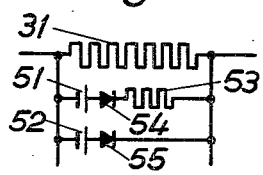
Figure 9:
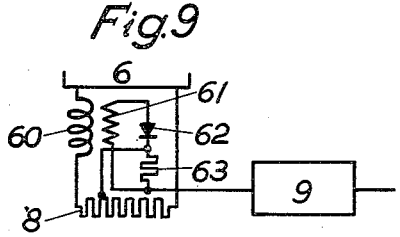

In Fig. 3, the means for deriving the complementary function are of substantially the same kind as in Fig. 1, namely, a condenser 2 and an ohmic resistor 3 connected in series to the alternating current terminals 1. The complementary voltage is tapped between the point of junction between the condenser and the resistor and a point on an impedance 70, for instance an ohmic resistor, connected between the terminals 1. A current proportional to the voltage between terminals 1 traverses a magnetizing winding 71 of an only diagrammatically illustrated transductor 72 and a current proportional to the complementary voltage traverses a magnetizing winding 73 of a diagrammatically shown transductor 74. The transductors 72 and 74 are fed from different phases 75, 76 of a two-phase high frequency generator 77, the frequency thereof being so high that the voltages and currents in the system 1, 2, 3 as compared therewith can be regarded as constant over a few cycles of the high frequency system. The transductors (direct current saturable reactors) are supposed to be of the kind, well known per se, in which the high frequency alternating current is substantially proportional to the magnetizing, only comparatively slowly changing current. The high frequency alternating currents, which are mutually in quarter-phase, traverse in parallel a rectifier 78 connected between the point of junction of the two transductors and that of the phase windings 75, 76 in the generator 77. The current through the rectifier 78 therefore will be equal to the vector sum of the two transductor currents, thus to the square root of the sum of their squares, as the currents are in quarter-phase. The rectified current from the rectifier 78 is impressed on the potentiometric resistor 8, from which a current is impressed on the current responsive member 9 as before.

The transductors 72, 74 are, as aforesaid, only diagrammatically shown, but should preferably be of the character described for instance in the British patent specification No. 537,930 so as to admit substantially sine-shaped alternating currents adapted to be added together vectorially.

Figure 4:
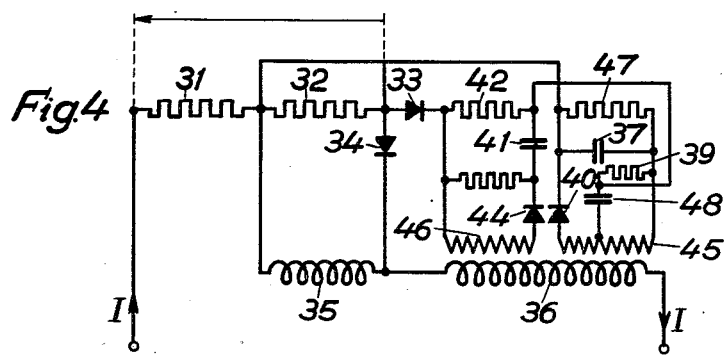
Figure 5:
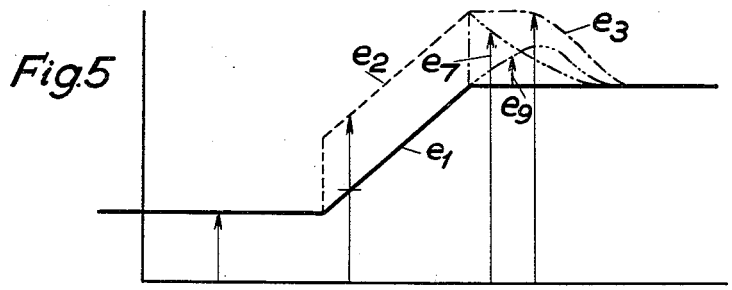
Figure 6:
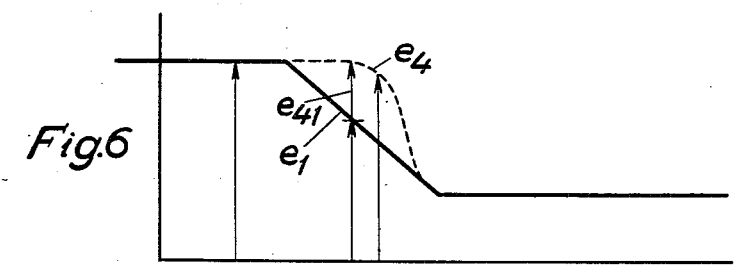

The member 9 should generally in practice furnish a voltage which is not only proportional to the load current of the converter but also pays respect in different manners to the time derivative of the said current, and may therefore for instance be arranged as shown in Fig. 4, while Figs. 5 and 6 explain its manner of operation under different conditions. The requirements which may be made for the current-dependent voltage are for instance the following ones:

(1) In the stationary state, the voltage shall be proportional to the load current, and under transient conditions, the proportionality factor may never be less than the proportionality factor in the stationary state.

(2) If the time derivative of the load current is positive, the voltage should be increased by an amount which is substantially proportional to the said derivative, since it can be assumed that the additional current to be commutated is as a mean proportional to the said derivative. This addition should be made instantaneously and remain as long as the derivative is positive.

(3) When the current derivative ceases to be positive, the voltage should preferably at the first instant be kept unaltered and then gradually decrease to the value corresponding to the current then prevailing. A decrease in voltage corresponds to a displacement towards a later commutation, and with respect to the commutation in other phases it may be advisable not to make this displacement too rapid.

(4) For a negative derivative, the voltage should initially retain its previous value and then gradually assume the value corresponding to the decreasing or lower current.

The two last-mentioned conditions may be summarized in such manner that for negative values of the second time derivative of the current a certain smoothening of the current-dependent control voltage curve should take place.

For satisfying the two first conditions, a current proportional to the loading direct current and preferably separated therefrom, for instance obtained by means of a transductor and a rectifier, traverses two series-connected ohmic resistors 31, 32, the second 32 of which is connected in parallel to a reactor 35 through a valve 34, while another valve 33 is connected in series with further means serving to satisfy the other conditions. The valves 33, 34 are so connected that a back current can never flow through any of the resistors 31, 32, whence the voltage drop therein can never be smaller than that corresponding to the real load current. The ohmic resistance in the reactor 35 is small compared with the resistor 32, whence in the case of constant current the major portion thereof flows through the reactor and the voltage drop in the resistor 32 thus is small. When the time derivative of the current is positive, the inductive voltage drop across the reactor 35 is added to the ohmic drop in the resistor 31, while for a negative value of the said derivative the valve 34 prevents the reactor 35 from forcing any back current through the resistor 32, whence the total voltage drop will then be that corresponding to the resistor 31.

For satisfying the third and the fourth condition several apparatus are provided which are fed from secondary windings of a reactor 36 traversed by the current proportional to the load current. One of these secondary windings, designated by 45, feeds a condenser 37 through a valve 40. This condenser will therefore, when the time derivative of the current has been positive during a certain time, obtain a voltage which by suitably dimensioning the circuit can be made equal to the voltage across the reactor 35. One terminal of the condenser is directly connected to one end of the resistor 32, while the other terminal is connected through two resistors 39 and 42 with the other end of the resistor 32. The resistor 39 is fed through a condenser 48 from a portion of the secondary winding 45.

The mode of operation of the lastly described means, which serve to fulfill the third condition specified above, is illustrated in Fig. 5. When the current has had a substantially constant positive time derivative during a certain time and a constant value has thus been added to the voltage $e$, across the resistor 31, giving the voltage curve 32, and when the positive derivative then suddenly ceases, a couple of voltages are then added to the voltage $e_1$, thereafter constant, one of these voltages $e_7$ being taken from the condenser 37 and the other $e_9$ from the resistor 39. The former decreases according to a normal discharge curve, as the condenser discharges through the resistor 47. The voltage across the resistor 39, on the other hand, for a suitable dimensioning of the several elements of the feeding circuit, substantially follows an aperiodically damped oscillation, which begins at the instant when the voltage across the reactor 36 disappears, i. e. when the main current changes from a rising to a constant value. The said oscillation is reproduced by the curve $e_9$, and the sum of $e_7$ and $e_9$ gives the curve $e_3$ which corresponds to the third condition of a gradual decrease of the current-dependent voltage to a final value which corresponds to the new stationary state. The valve 40 prevents the condenser 37 from charging in the opposite sense when the current derivative is negative.

When the current derivative changes to a negative from zero value, the members 41, 42, 43, 44 enter into function. The voltage should then substantially follow the dotted curve $e_4$ in Fig. 6. The negative current derivative creates a voltage across the winding 46, which charges the condenser 41 through the valve 44, and at the same time the condenser 48 is charged from the winding 45. The charging circuit in this case contains no valve, and the condenser 48 is therefore charged in the opposite sense to that of a positive time derivative. The circuit through the condenser 41 and the resistors 42, 43 is substantially aperiodically damped, which gives an oscillation $e_{41}$ of the voltage across the resistor 42, which at an appropriate dimensioning, added to the voltage across the resistor 39, corresponds to the difference between the dotted curve $e_4$ and the full drawn line $e_1$ of Fig. 6. The valve 44 blocks when the current derivative is positive, and the resistor 43 serves to discharge the condenser 41 after its function has been accomplished.

Figure 7:
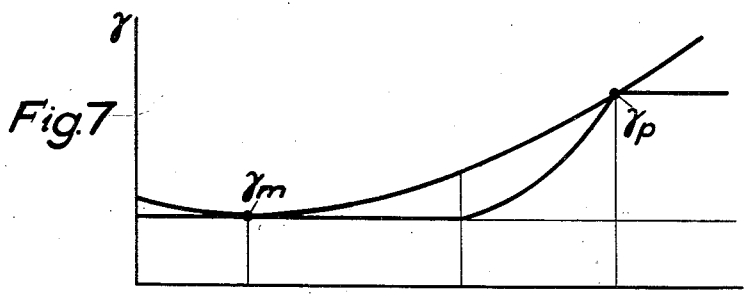

The angle $\gamma$ appearing in one term of the expression for $F(x)$ and forming a measure of the time difference between the completion of the commutation and the zero passage of the voltage may, as already stated, either be constant or be regulated according to a certain programme. In Fig. 1 it has been supposed to be constant, and the term in question is then obtained from the resistor 8. It is true that the active portion of said resistor is adjustable, but it is not automatically altered in dependence of current, voltage or time. However, the conditions may make it desirable to make $\gamma$ more or less dependent on different operational quantities, for instance on the current. Fig. 7 is intended to illustrate diagrammatically one example of such a programme regulation of $\gamma$, while Fig. 2 shows an example of a connection for its realisation.

In Fig. 7, the abscissae represent the ratios between current and voltage, while the ordinates represent different values of the angle $\gamma$. It should be noted in this connection that for a normal value of current and voltage it is customary to guarantee a certain value of $\gamma$ which should be neither lower nor higher than that value, as in the first case the commutation may fail and in the second the reactive power demand will be too large. These values of $I/E$ and of $\gamma$ are represented by the point $\gamma_m$ in Fig. 7. In practice it is desirable that the value of $\gamma$ does not go below the value of $\gamma_m$ neither at higher nor at lower values of I/E, whence $\gamma_m$ should represent the lowest point of the curve for $\gamma$.

The more the ratio I/E rises, the more the need for an increased "commutation margin" $\gamma$ appears, and this will especially be the case when the ratio becomes so large that the commutation requires a time of about 45°, because two successive commutations of an ordinary sixpulse inverter then show a tendency to disturb each other. As an example, the angle $\gamma$ may then assume the value of $\gamma_p$ in Fig. 7.

The three conditions now stated, that the curve of $\gamma$ shall pass through the points $\gamma_m$ and $\gamma_p$ and be horizontal in the first-named point, are sufficient to determine the curve if it shall be of a very simple type, as a parabolic or circular arc, which is both easiest to realize and otherwise most appropriate. In order to create such a curve it is, as a calculation shows, advisable to modify in various manners the three terms of the expression for $F(x)$, so that for instance the angle $x$ in the first term is reduced by a certain angle, while the two other terms are multiplied by certain coefficients, the first smaller and the second larger than 1. In a numerical example, the aforesaid angle reduction will be about 40°, the coefficient of $\gamma$ about 0.5 and that of I about 1.6. In Fig. 2, these modifications have been effected by connecting in series with the transformer windings 12, 22 a pair of windings 16, 17 on the transformer directly connected to the terminals 1, by connecting a minor portion of the resistor 8 in the grid control circuits, and by connecting larger resistors in the current-responsive apparatus 9.

On account of the commutation margin, it may sometimes also be advisable to introduce a further current component in the resistor forming part of the current-responsive circuit. This may be done for instance by the connection shown in Fig. 8. In parallel to the resistor 31, there are in Fig. 8 connected two current paths, each containing a direct current source 51, 52 respectively, the source 51 being in series with a resistor 53. In each of the circuits, there is further a valve 54, 55 respectively. There may also be further parallel circuits containing different resistances and voltage sources. As long as the current impressed from outside through the resistor 31 exceeds the current which the source 51 or 52 is able to force through this resistor, the latter current sources have no influence, but if the current from outside drops below any of the aforesaid values, the corresponding current source determines the current and thereby the voltage drop in the resistor 31. The result will be that for a load current below a certain value, for instance the normal value, the initiation of the commutation—under otherwise unaltered conditions—takes place as early as at the said value. Since the commutation then takes less time, the respect distance is increased, which in some cases may be advantageous by reducing the average risk of disturbances.

The devices now described have been found satisfactory when the peak value of the voltage is not materially altered during a semicycle as well as when the said peak value sinks rapidly. If, on the other hand, the voltage is suddenly raised for instance from an earlier low value to the normal value, this may involve that the commutation begins too late and therefore cannot be completed in due time. For preventing this, a device according to Fig. 9 may be introduced. In this figure, there is connected between the device 6 giving the square sum and its potentiometric resistor 8, a reactor 60 provided with a secondary winding 61 which feeds, through a valve 62, a resistor 63 so connected that the voltage drop across the same is subtracted from the rest of the voltages in the circuit. At a sudden rise of voltage, part thereof is absorbed by the reactor 60, and hereby a voltage is created also in the secondary winding 61, and this voltage further reduces the remaining voltage to a value determined by the ratio of the reactor windings. By the valve 62, any influence of the secondary winding 61 at a reduction of voltage is prevented. If the secondary winding is dimensioned for a lower voltage, the valve 62 may possibly be omited.

We claim as our invention:

1. Control system for a polyphase static power converter, comprising a first means with input terminals for delivering an igniting impulse to said converter at an instant being determined by a voltage applied to said input terminals, a second means influenced by the load current of said converter, and producing a voltage substantially proportional to said load current, and a third means influenced by the voltage between a relieved phase and a relieving phase of said converter and producing a voltage substantially proportional to the peak value of the voltage between said phases, the output voltages of said second and said third means being series connected to said input terminals of said first means.

2. Control system for a polyphase static power converter, comprising a first means with input terminals responsive to an alternating voltage input and arranged to produce an igniting impulse each time the instantaneous value of said input voltage attains a predetermined value, a second means influenced by the load current of said converter and producing a voltage substantially proportional to said load current, a third means influenced by the voltage between a relieved phase and a relieving phase of said converter and producing a voltage substantially proportional to the peak value of the voltage between said phases, and a fourth means influenced by the voltage between said relieved phase and said relieving phase of said converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

3. Control system for a polyphase static power converter, comprising a first means with input terminals responsive to an alternating voltage input and arranged to produce an igniting impulse each time the instantaneous value of said input voltage attains a predetermined value, a second means influenced by the load current of said converter and producing a voltage having one component substantially proportional to said load current, and another component being determined by the time variations of said load current, a third means influenced by the voltage between a relieved phase and a relieving phase of said converter and producing a voltage substantially proportional to the peak value of the voltage between said phases, and a fourth means influenced by the voltage between said relieved phase and said relieving phase of asid converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

4. Control system for a polyphase static power converter, comprising a first means with input terminals responsive to an alternating voltage input and arranged to produce an igniting impulse each time the instantaneous value of said input voltage attains a predetermined value, a second means influenced by the load current of said converter and producing a voltage having one component substantially proportional to said load current and another component being determined by the time variations of said load current, a third means influenced by the voltage between a relieved phase and a relieving phase of said converter and producing a voltage substantially proportional to the peak value of a preceding half wave of the voltage between said phases, and a fourth means influenced by the voltage between said relieved phase and said relieving phase of said converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

5. Control system for a polyphase static power converter, comprising a first means with input terminals responsive to an alternating voltage input and arranged to produce an igniting impulse each time the instantaneous value of said input voltage attains a predetermined value, a second means influenced by the load current of said converter and producing a voltage substantially proportional to said load current, a third means influenced by the voltage between a relieved phase and a relieving phase of said converter and producing a voltage substantially proportional to the peak value of a preceding half wave of the voltage between said phases, and a fourth means influenced by the voltage between said relieved phase and said relieving phase of said converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

6. Control system for a polyphase static power converter, comprising a first means with input terminals for delivering an igniting impulse to said converter at an instant being determined by a voltage applied to said input terminals, a second means influenced by the load current of said converter and producing a voltage having one component substantially proportional to said load current and another component being determined by the time variations of said load current, and a third means influenced by the voltage between a relieved phase and a relieving phase of said converter and producing a voltage substantially proportional to the peak value of the voltage between said phases, the output voltages of said second and said third means being series connected to said input terminals of said first means.

7. Control system for a polyphase static power converter, comprising a first means with input terminals for delivering an igniting impulse to said conveter at an instant being determined by a voltage applied to said input terminals, a second means influenced by the load current of said converter and producing a voltage having one component substantially proportional to said load current and another component being determined by the time variations of said load current, and a third means influenced by the voltage between a relieved phase and a relieving phase of said converter and producing a voltage substantially proportional to the peak value of a preceding half wave of the voltage between said phases, and the output voltages of said second and said third means being series connected to said input terminals of said first means.

8. Control system for a polyphase static power converter, comprising a first means with input terminals for delivering an igniting impulse to said converter at an instant being determined by a voltage applied to said input terminals, a second means influenced by the load current of said converter, and producing a voltage substantially proportional to said load current, and a third means influenced by the voltage between a relieved phase and a relieving phase of said converter and producing a voltage substantially proportional to the peak value of a preceding half wave of the voltage between said phases, and the output voltages of said second and said third means being series connected to said input terminals of said first 9. Control system for a polyphase static power conveter, comprising a first means with input terminals for delivering an igniting impulse to said converter at an instant being determined by a voltage applied to said input terminals, a second means influenced by the load current including a voltage limiting means and producing a voltage substantially proportional to said load current but being limited to a certain lower value, and a third means influenced by the voltage between a relieved phase and a relieving phase of said converter, and producing a voltage substantially proportional to the peak value of the voltage between said phases, and the output voltages of said second and said third means being series connected to said input terminals of said first means.

10. Control system for a polyphase static power converter, comprising a first means with input terminals responsive to an alternating voltage input and arranged to produce an igniting impulse each time the instantaneous value of said input voltage attains a predetermined value, a second means influenced by the load current, including a voltage limiting means and producing a voltage substantially proportional to said load current but being limited to a certain lower value, a third means influenced by the voltage between a relieved phase and a relieving phase of said converter and producing a voltage substantially proportional to the peak value of the voltage between said phases, and a fourth means influenced by the voltage between said relieved phase and said relieving phase of said converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

11. Control system for a polyphase static power converter, comprising a first means with input terminals responsive to an alternating voltage input and arranged to produce an igniting impulse each time the instantaneous value of said input voltage attains a predetermined value, a second means influenced by the load current including a voltage limiting means and producing a voltage having one component substantially proportional to said load current and another component being determined by the time variations of said load current, said last mentioned voltage being limited to a certain lower value, a third means influenced by the voltage between a relieved phase and a relieving phase of said converter and producing a voltage substantially proportional to the peak value of the voltage between said phases, and a fourth means influenced by the voltage between said relieved phase and said relieving phase of said converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

12. Control system for a polyphase static power converter, comprising a first means with input terminals for delivering an igniting impulse to said converter at an instant being determined by a voltage applied to said input terminals, a second means influenced by the load current including a voltage limiting means and producing a voltage having one component substantially proportional to said load current and another component being determined by the time variations of said load current, said last mentioned voltage being limited to a certain lower value, and a third means influenced by the voltage between a relieved phase and a relieving phase of said converter and producing a voltage substantially proportional to the peak value of the voltage between said phases, the output voltages of said second and third means being series connected to said input terminals of said first means.

13. Control system for a polyphase static power converter, comprising a first means with input terminals for delivering an igniting impulse to said converter at an instant being determined by a voltage applied to said input terminals, a second means influenced by the load current, including a voltage limiting means and producing a voltage substantially proportional to said load current but being limited to a certain lower value, and a third means influenced by the voltage between a relieved phase and a relieving phase of said converter and producing a voltage containing one component substantially proportional to the peak value of the voltage between said phases and another component determined by the time variations of said peak value, the output voltages of said second and third means being series connected to said input terminals of said first means.

14. Control system for a polyphase static power converter, comprising a first means with input terminals responsive to an alternating voltage input and arranged to produce an igniting impulse each time the instantaneous value of said input voltage attains a predetermined value, a second means influenced by the load current, including a voltage limiting means and producing a voltage substantially proportional to said load current but being liimted to a certain lower value, a third means influenced by the voltage between a relieved phase and a relieving phase of said converter and producing a voltage containing one component substantially proportional to the peak value of the voltage between said phases and another component determined by the time variations of said peak value, and a fourth means influenced by the voltage between said relieved phase and said relieving phase of said converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

15. Control system for a polyphase static power converter, comprising a first means with input terminals responsive to an alternating voltage input and arranged to produce an igniting impulse each time the instantaneous value of said input voltage attains a predetermined value, a second means influenced by the load current including a voltage limiting means and producing a voltage having one component substantially proportional to said load current and another component being determined by the time variations of said load current, and said last mentioned voltage being limited to a certain lower value, a third means influenced by the voltage between a relieved phase and a relieving phase of said converter and producing a voltage containing one component substantially proportional to the peak value of the voltage between said phases and another component determined by the time variations of said peak value, and a fourth means influenced by the voltage between said relieved phase and said relieving phase of said converter and producing a substantially sinusoidal voltage being displaced in phase in relation to the voltage between said two phases, the output voltages of said second, third and fourth means being series connected to said input terminals of said first means, and said first means delivering the igniting impulse of said relieving phase of said converter.

16. Control system for a polyphase static power converter, comprising a first means with input terminals for delivering an igniting impulse to said converter at an instant being determined by a voltage applied to said input terminals, a second means influenced by the load current including a voltage limiting means and producing a voltage having one component substantially proportional to said load current and another component being determined by the time variations of said load current and said last mentioned voltage being limited to a certain lower value, and a third means influenced by the voltage between a relieved phase and a relieving phase of said converter and producing a voltage containing one component substantially proportional to the peak value of the voltage between said phases and another component determined by the time variations of said peak value, the output voltages of said second and said third means being series connected to said input terminals of said first means.

References Cited in the file of this patent

UNITED STATES PATENTS

| 2,310,101 | Lord | Feb. 3, 1943 |
| 2,404,643 | Livingston | July 23, 1946 |
| 2,479,242 | Lamm | Aug. 16, 1949 |
| 2,600,519 | Solomon | June 17, 1952 |
| 2,608,606 | Lonnemann | Aug. 26, 1952 |

FOREIGN PATENTS

| 670,533 | Germany | Jan. 20, 1939 |